United States Patent [19]

Simpkins

[11] Patent Number: 5,600,545
[45] Date of Patent: Feb. 4, 1997

[54] APPARATUS AND METHOD FOR A SWITCHING POWER SUPPLY WITH A POWER STEERING CLAMP

[75] Inventor: Joseph A. Simpkins, West Chester, Pa.

[73] Assignee: Mars, Incorporated, McLean, Va.

[21] Appl. No.: 376,932

[22] Filed: Jan. 23, 1995

[51] Int. Cl.$^6$ .................................................. H02M 3/335
[52] U.S. Cl. ................................................ 363/21; 363/56
[58] Field of Search ................................ 363/18, 19, 20, 363/21, 49, 56, 131

[56] References Cited

U.S. PATENT DOCUMENTS

| | | | |
|---|---|---|---|
| 4,639,849 | 1/1987 | Noworolski et al. | 363/56 |
| 5,019,957 | 5/1991 | Wilkinson | 363/56 |
| 5,079,689 | 1/1992 | Gidon et al. | 363/131 |
| 5,331,532 | 7/1994 | Iwai et al. | 363/20 |

OTHER PUBLICATIONS

S. Clemente, B. Pelly, R. Ruttonsha, "A Universal 100 kHZ Power Supply Using a Single HEXFET®," International Rectifier, HEXPET® Designer's Manual, pp. 15–26, 1993.

Silicon General Product Catalog, "Solutions for Data Conversion and Power Management", pp. 4–191 to 4–208, Dec., 1989.

*Primary Examiner*—Peter S. Wong
*Assistant Examiner*—Adolf Berhane
*Attorney, Agent, or Firm*—Fish & Richardson P.C.

[57] ABSTRACT

A switching power supply having a power steering clamp is disclosed. The power supply may suitably include a pulse width modulator controller which controls a first switch for controlling the flow of energy into and out of a transformer. The power steering clamp suitably includes a second switch, clamp diodes, and circuitry for driving the gate of the second switch. The circuitry for driving the gate of the second switch is preferably controlled by the pulse width modulator controller. Use of the power steering clamp permits leakage energy to be rerouted subsequently to the transformer. This feature may improve the efficiency of the circuit and also avoids the need for heat sinks to prevent overheating of circuit components. Such a switching power supply is particularly suitable for use in high density devices, such as a banknote or bill validator.

21 Claims, 6 Drawing Sheets

APPARATUS AND METHOD FOR A SWITCHING POWER SUPPLY WITH A POWER STEERING CLAMP

FIELD OF THE INVENTION

The present invention relates generally to power supplies, and, in particular, to switching power supplies having a power steering clamp.

BACKGROUND OF THE INVENTION

Certain high-density electronic devices, such as currency or bill validators, use switching power supplies to provide the needed voltage levels, for example, to drive the various components of the validator. Such power supplies, however, may require high power switches which may be damaged by high voltage transients. Furthermore, certain known switcher designs dissipate commonly found energy transients as heat, for example, through the use of an RC circuit. Such designs not only waste the unused energy, but typically require heat sinks or other means to prevent the validator from overheating and damaging electrical or other components.

It is, therefore, desirable to provide a switching power supply which overcomes the aforementioned problems and which can be advantageously used in high-density devices, such as banknote validators.

SUMMARY OF THE INVENTION

The present invention overcomes the aforementioned difficulties by providing a switching power supply having a power steering clamp. In one embodiment of the present invention, the switching power supply includes at least one lead for connection to a power source such as an 115 ac voltage power supply. The switching power supply also includes energy storage means and preferably a pulse width modulator controller. It preferably includes a first switch controlled by the pulse width modulator controller for controlling the energy into and out of a transformer. The transformer reflects leakage energy back to the energy storage means. In particular, the power steering clamp, which preferably includes a second switch, routes the leakage energy from the transformer to the energy storage means.

In a preferred embodiment, the power steering clamp suitably includes, in addition to the second switch, clamp diodes and circuitry for driving the gate of the second switch. The circuitry for driving the gate of the second switch is preferably controlled by the pulse width modulator controller.

According to one aspect of the present invention, use of the power steering clamp permits leakage energy to be stored for subsequent use. This feature may improve the efficiency of the circuit. It may also avoid the need for heat sinks to prevent overheating of circuit components. In particular, the power supply of the present invention is suitable for use in high density electronic devices, such as a bill validators.

In a preferred and exemplary use of the present invention, the power supply may be configured for use in a banknote or bill validator. In particular, secondary coils of the transformer may suitably be connected electrically, for example, to motors, signal processing circuitry, and light emitting diodes which comprise other portions of a bill validator.

Additional features and advantages of the present invention will be readily apparent by reference to the following detailed description and accompanying drawings.

DETAILED DESCRIPTION

Figure 1:
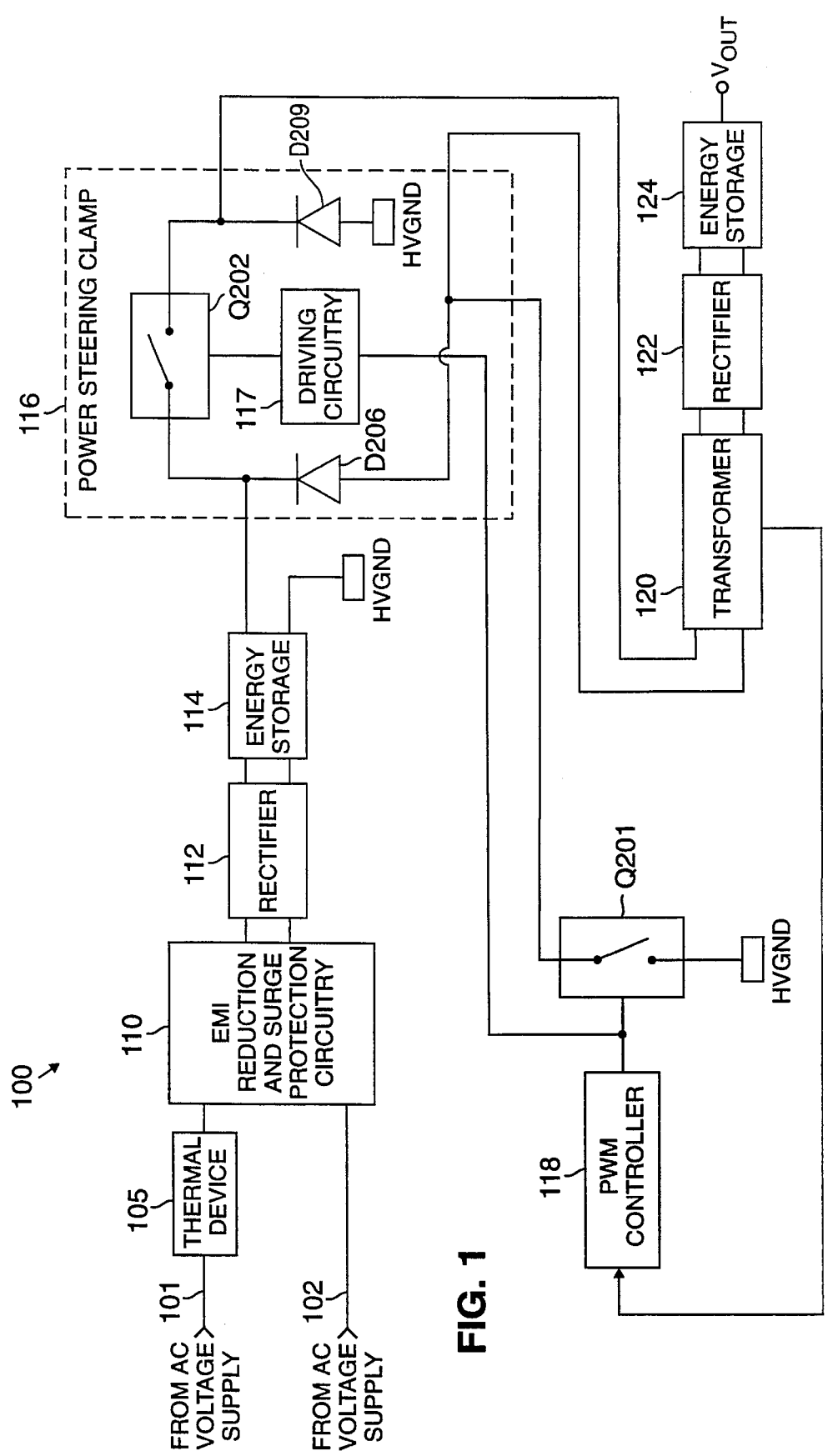
FIG. 1 is a block diagram of an exemplary switching power supply according to the principles of the present invention.

FIG. 1 is a block diagram of an exemplary switching power supply 100 according to the principles of the present invention. During operation, the switching power supply 100 requires a power source, and thus preferably includes means for connection to a power source. As shown in FIG. 1, the switching power supply may suitably have one or more leads 101, 102 for connection to an outlet providing, for example, a 115 AC voltage supply. A thermal device 105 is preferably connected in series with one of the leads 101, 102 to prevent the power supply 100 from drawing too much power. The power supply 100 also preferably has electromagnetic interference (EMI) reduction and surge protection circuitry 110. The power supply 100 may suitably include a rectifier 112 which converts the AC voltage supply to a DC voltage supply. The rectifier 112 may then be connected to energy storage means 114.

The power supply 100 of the present invention further comprises a power steering clamp 116 which is described in greater detail below. In a preferred embodiment, the power steering clamp 116 may be controlled by a pulse width modulator (PWM) controller 118 and associated circuitry. The PWM controller 118 also controls a first high power switch Q201. An example of a suitable switch Q201 is a high power switch part number IRFR 224 available from the International Rectifier Company. When the switch Q201 is closed, a transformer 120, which is connected electrically to the switch Q201 and to the power steering clamp 116, stores energy. When the switch Q201 is open, the transformer 120 releases the stored energy, which may then be sent, via a rectifier 122, to another energy storage means 124. Leakage energy may also be released by the transformer 120, and is preferably rerouted back to the energy storage means 114 by the voltage steering clamp 116. A desired output voltage $V_{OUT}$ may be obtained from the energy storage means 124. The transformer 120 may also be connected to the PWM controller 118 to provide a feedback signal to control the duty cycle of the PWM controller 118.

Figure 2A:
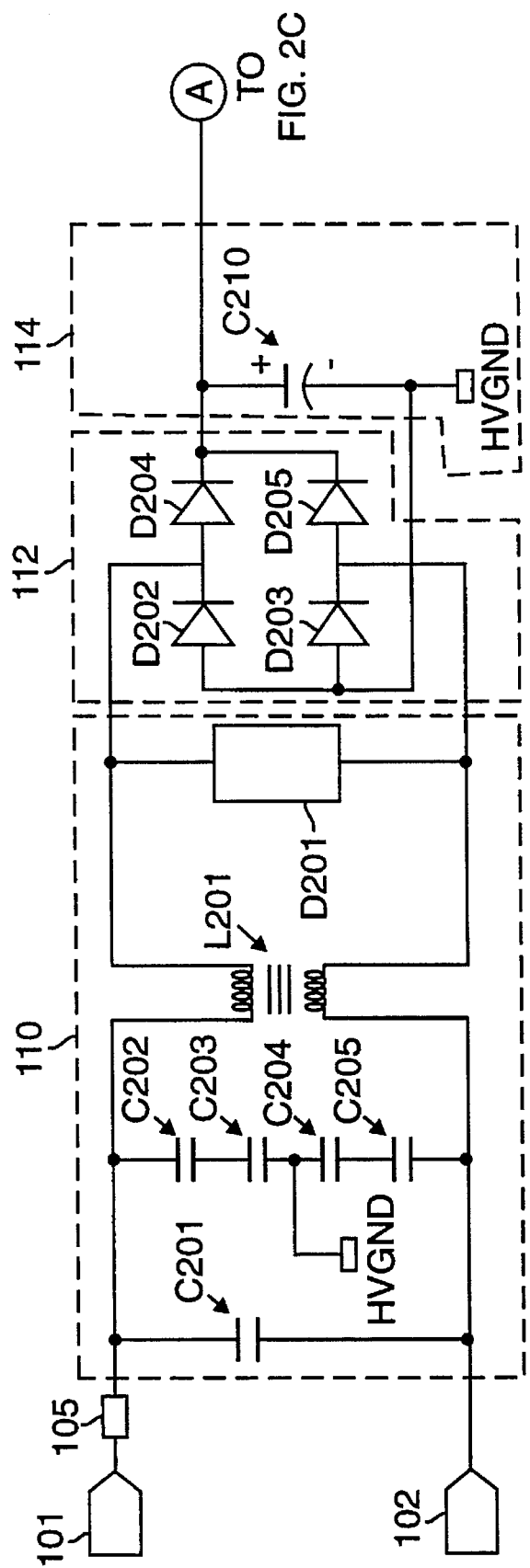
FIGS. 2A through 2C is a schematic diagram showing a preferred embodiment of the power supply of FIG. 1.
Figure 2B:
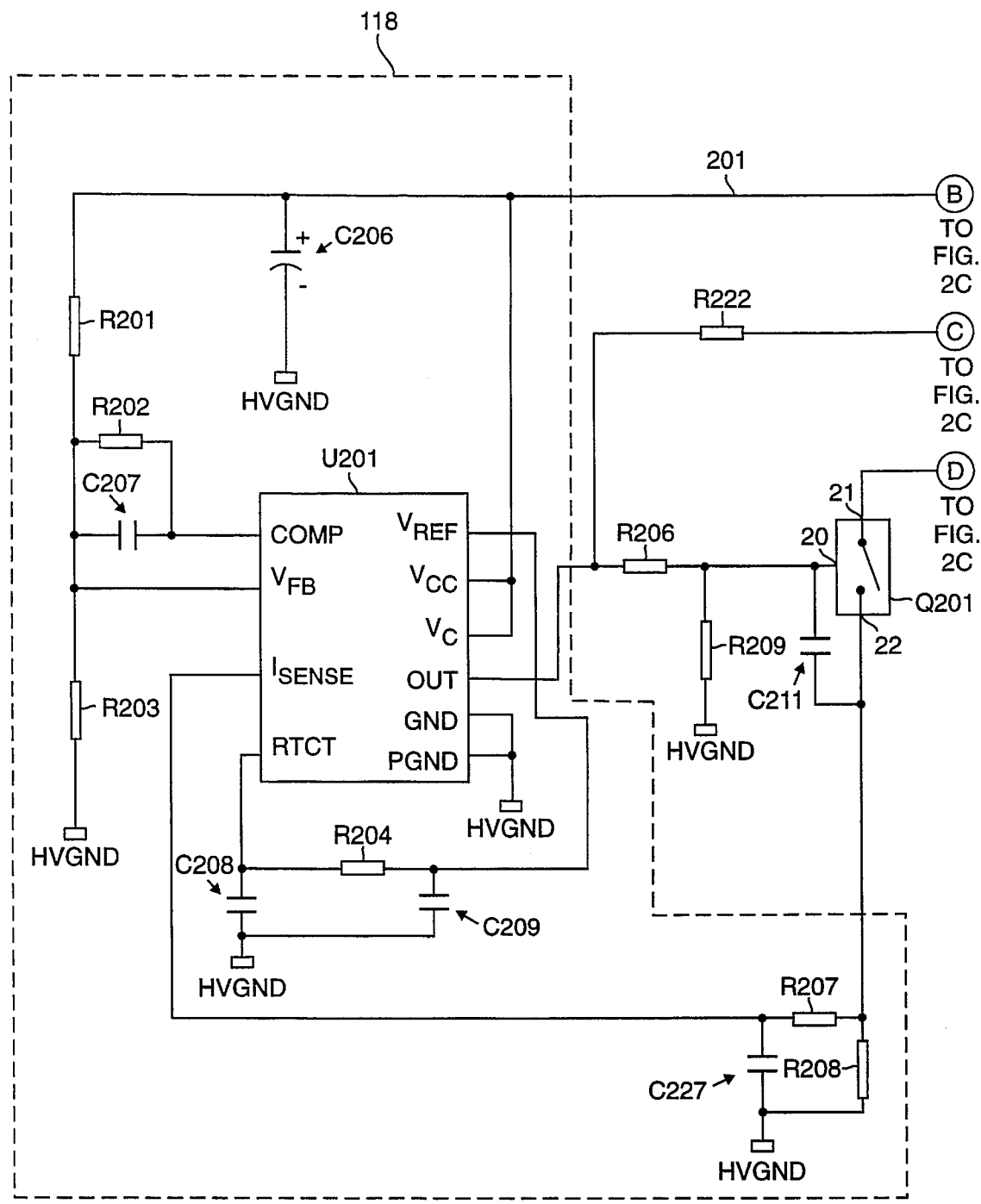
Figure 2C:
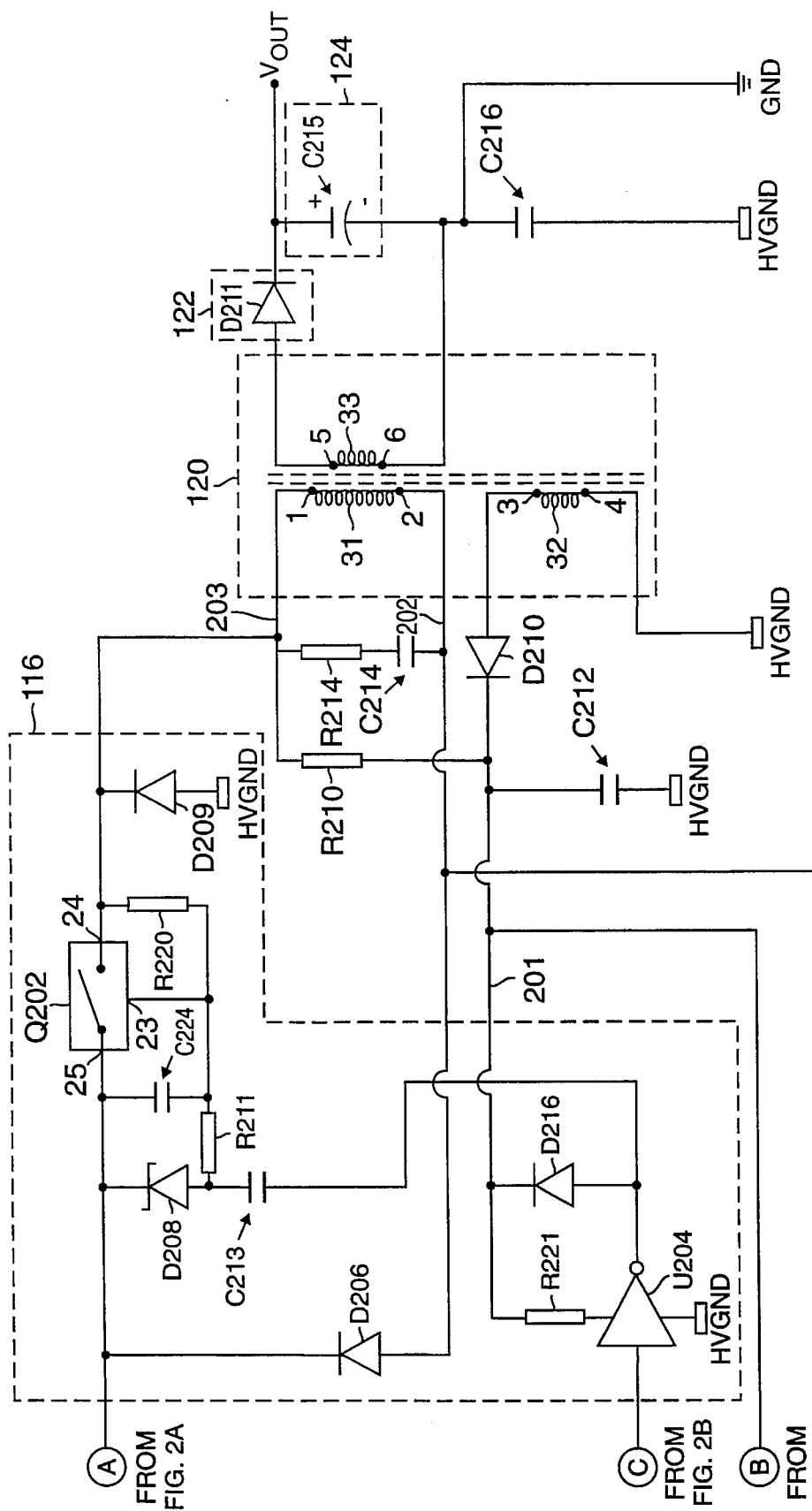

FIGS. 2A through 2C form a schematic diagram showing a preferred embodiment of the power supply 100. Referring to FIG. 2A, the thermal device 105 may suitably comprise a fuse connected in series with the lead 101. With further reference to FIG. 2A, the EMI reduction and surge protection circuitry 110 may suitably comprise a plurality of capacitors C202, C203, C204, C205, and a common mode choke L201, connected in a manner well known in the art as shown in FIG. 2A, to reduce electromagnetic interference. Also, a capacitor C201 preferably is connected in parallel with the lead 102 and the thermal device 105. The EMI reduction and surge protection circuitry 110 may further comprise a surge or transient suppressor D201.

A rectifier circuit 112 is connected electrically to the EMI reduction and surge protection circuitry 110 and may suitably comprise a plurality of diodes D202, D203, D204, D205, to form a bridge rectifier as is known in the art and as shown in FIG. 2A. The outputs of the rectifier 112 may then be electrically connected to an energy storage means 114, which may suitably comprise a capacitor C210 with one junction connected to the cathode of the diode D204 and the other junction connected to the anode of the diode D203 and connected to high-voltage ground (HVGND).

Referring to FIG. 2B, the PWM controller 118 and associated circuitry may comprise a pulse width modulator (PWM) controller U201 configured. A suitable PWM controller U201 is an SG2844 device, commercially available from the Silicon General Company. In FIG. 2B, the PWM controller U201 has two input pins labelled and $V_{FB}$ and $I_{SENSE}$, respectively, and an output pin labelled OUT. Additional pins of the PWM U201 are labelled COMP, RTCT, $V_{REF}$, $V_{CC}$, $V_C$, GND, and PGND, as shown. The $V_{CC}$ and $V_C$ pins supply power to the PWM controller U201 and may be connected electrically to a lead 201, with a capacitor C206 connected between the lead 201 and HVGND. The GND and PGND pins of the PWM controller U201 may be tied to HVGND. The RTCT and $V_{REF}$ pins may be connected electrically via a resistor R204. The RTCT and Vref pins may also be connected to HVGND via capacitors C208 and C209, respectively.

As shown in FIG. 2B, the $V_{FB}$ pin controls the duty cycle of the PWM controller U201 may be connected to HVGND via a resistor R203. The resistor R203 is connected electrically to the junction of another resistor R201 which, in turn, may be connected to the lead 201. One junction of a resistor R202 and one junction of a capacitor C207 may be connected electrically to a respective junction of each of the resistors R201, R203, as shown in FIG. 2B. In addition, the resistor R202 and the capacitor C207 may be connected in parallel and may be connected to the COMP pin of the PWM controller U201, as shown in FIG. 2B.

The $I_{SENSE}$ pin of the PWM controller U201 is used to sense the amount of current flowing through the first high power switch Q201, which may operate in an on state or an off state, corresponding to the situations where the switch Q201 is closed or open, respectively. Thus, for example, if the current is too high, the PWM controller U201 may be shut off and the switch Q201 opened. The switch Q201 may suitably have a gate 20, a drain 21 and a source 22. Switches, however, not having a gate, drain and source may also be suitable as the switch Q201. The $I_{SENSE}$ pin may be connected to HVGND via a capacitor C227. The $I_{SENSE}$ pin may also be connected to one junction of a resistor R207. The resistor R207 may be connected, in turn, to the source 22 of the switch Q201, and to HVGND via another resistor R208. The OUT pin of the PWM controller Q201 may be connected, via a resistor R206, to the gate 20 of the switch Q201. The gate 20 of the switch Q201 is also preferably connected to HVGND via a resistor R209. The gate 20 and the source 22 of the switch Q201 are preferably tied together via a capacitor C211. The OUT pin of the PWM controller U201 may also be connected to a resistor R222 for connection to driving circuitry associated with the power steering clamp 116, as further explained below. The resistors R206, R209, R222 and the capacitor C211 help further reduce electromagnetic interference.

As indicated above, the power supply of the present invention also includes a power steering clamp 116. In general, as shown in FIG. 1, the power steering clamp 116 preferably comprises a second high power switch Q202, a plurality of clamp diodes D206 and D209, and driving circuitry 117. An example of a suitable switch Q202 is an IRFR 9220 device available from the International Rectifier Company. Suitable diodes D206, D209 are EGL 41G devices available from General Instrument Company.

With reference to FIG. 2C, the switch Q202 of the power steering clamp 116 may suitably comprise a gate 23, a drain 24 and a source 25. Switches, however, not having a gate, drain and source may also be suitable for use as the switch Q202. The source 25 of the switch Q202 preferably is tied to the positive junction of the capacitor C210 of FIG. 2A. The cathode of the diode D206 preferably is connected electrically to the source 25 of the switch Q202, and the anode of the diode D206 preferably is tied to the drain 21 of the switch Q201. The drain 24 of the switch Q202 preferably is tied to the cathode of the diode D209, the anode of which preferably is tied to HVGND, as shown in FIG. 2C.

In a preferred embodiment of the present invention, the PWM controller U201 controls the second switch Q202 directly via circuitry to drive the gate of the switch Q202. In the preferred embodiment, the driving circuitry 117 comprises a high power fast inverter U204 and voltage translation circuitry. The components of the driving circuitry should be suitable for operating at speeds of approximately 82 KHz. A suitable high power fast inverter U204 is an SI 9942 complementary MOSFET high speed inverter available from the Siliconix Company. The inverter U204 and the voltage translation circuitry may be ac coupled. Thus, for example, the voltage translation circuitry may comprise a fast Zener or transient suppressor diode D208 and a capacitor C213, as shown in FIG. 2C. Inputs of the inverter U204 may be connected to the OUT pin of the PWM controller U201 via the resistor R222 in FIG. 2B. In order to provide power to the inverter U204, appropriate pins of the inverter U204 may be connected to the lead 201, via a resistor R221, and to HVGND, respectively. The output of the inverter U204 may be connected to the anode of a protection diode D216, the cathode of which is also connected to the lead 201. The output of the inverter U204 is connected to one junction of the capacitor C213. The second junction of the capacitor C213 is connected to the anode of the diode D208, the cathode of which is tied to the source 25 of the switch Q202. A resistor R211 may be connected between the second junction of the capacitor C213 and the gate 23 of the switch Q202. Additionally, a capacitor C224 may be connected between the source 25 and the gate 23 of the switch Q202. The resistor R211 and the capacitor C224 help to reduce electromagnetic interference. Finally, a resistor R220 may be connected between the drain 24 and the gate 23 of the switch Q202 as shown in FIG. 2C.

A suitable diode D208 is a T6L41-15A device available from the General Instrument Company. Similarly, a suitable diode D216 is an SMBD 914 device available from the Motorola Company. The resistors R211, R220 and R221 may suitably have the values 47 Ohms, 820 k-Ohms and 56 Ohms, respectively. Similarly, the capacitors C213 and C224 may have the values 47 nF and 2.2 nF, respectively.

As shown in FIG. 2C, the transformer 120 comprises a primary coil 31, a control coil 32, and at least one secondary coil 33. In certain applications, however, it may be desirable to have more than one secondary coil. A pin 1 of the primary coil 31 preferably is connected to the drain 24 of the switch Q202 via a lead 203. A pin 2 of the primary coil 31 preferably is tied to the drain 21 of the switch Q201 in FIG. 2B and to the anode of the diode D206 as shown in FIG. 2C.

A resistor R214 and a capacitor C214, connected in series with one another, preferably are connected across the primary coil 31. The resistor R214 and the capacitor C214 serve further to reduce electromagnetic interference.

A pin 4 of the control coil 32 of the transformer 120 is preferably connected to HVGND. A pin 3 of the control coil 32 is connected to the anode of a diode D210 whose cathode is connected to the lead 201. Another capacitor C212 is preferably connected between the cathode of the diode D210 and HVGND. Furthermore, a resistor R210 is connected between the cathode of the diode D210 and the pin 1 of the primary coil 31.

A pin 6 of the secondary coil 33 of the transformer 120 may suitably be connected to GND. GND may also be connected, via a capacitor C216, to HVGND to provide further electromagnetic interference reduction. A pin 5 of the secondary coil 33 may be connected to the rectifier 122, which may suitably comprise a diode D211 with its anode connected to the pin 5. The energy storage means 124, which may suitably comprise a capacitor C215, is connected between the cathode of the diode D211 and pin 6 of the secondary coil 33. The desired output voltage $V_{OUT}$ may then be taken from the energy storage means 124 as shown in FIG. 2C.

The operation of the switching power supply of FIGS. 2A through 2C may be described generally as follows. When the leads 101, 102 are plugged into an outlet so as to provide, for example, a 115-volt AC voltage supply, a DC voltage appears across the capacitor C210 in FIG. 2A. In FIG. 2C, the voltage at the source 25 of the switch Q202 may be, for example, approximately 160 volts. The switch Q202 closes from the effect of the voltage across the resistor R220, and power is applied to the resistor R210. The capacitor C206 in FIG. 2B will then charge as well. When the capacitor C206 reaches a predetermined voltage, for example, sixteen volts, the PWM controller U201 is turned on. Once the PWM controller U201 turns on, it closes the switch Q201. At the same time, the PWM controller U201 also closes the switch Q202 via the driving circuitry 117. The voltage on the drain 21 of the switch Q201 will become approximately zero volts, while the voltage on the drain 24 of the switch Q202 becomes approximately 160 volts. When the switches Q201, Q202 close, the transformer 120 begins to charge.

During the charging state of the transformer 120, current flows from pin 1 to pin 2 of the primary coil 31 of the transformer 120, and the transformer 120 stores energy. Current flow in the control coil 32 of the transformer 120 is from pin 3 to pin 4. Thus the diode D210 is idle, and essentially no energy flows into or out of the control coil 32. Similarly, current flow in the secondary coil 33 of the transformer 120 is from pin 5 to pin 6. Thus the diode D211 is idle, and essentially no energy flows into or out of the secondary coil 33.

After a short duration of time which depends upon the duty cycle set by the PWM controller U201, the PWM controller U201 opens the switch Q201. At the same time, the PWM controller U201 opens the switch Q202 via the driving circuitry 117. When the switch Q201 opens, the secondary currents in the transformer 120 reverse direction. Thus, the capacitor C215 begins to charge, and its voltage rises to the desired $V_{OUT}$, which may be, for example, twelve volts. Similarly, the capacitors C206 and C212 charge, thereby supplying power and feedback to the PWM controller U201.

Also, as the switches Q201 and Q202 are opened, the voltage on the drain 24 of the switch Q202 falls slightly below ground, thereby forward-biasing the diode D209. At the same time, the voltage on the drain 21 of the switch Q201 will rise slightly above the voltage on the capacitor C210, thereby forward-biasing the diode D206. This situation allows transient leakage energy from the transformer 120 to be routed to and stored in the capacitor C210. Rather than being wasted as heat, for example, in an RC system, the energy may be reused during the next cycle of the PWM controller U201. Another advantage of rerouting the leakage energy is that the maximum voltages appearing across the switches Q201 and Q202 are maintained at a level less than the maximum voltage appearing across the capacitor C210.

The pulse width modulator U201 checks the voltage on the capacitor C206. If the voltage on the capacitor C206 is not sufficiently high, then the pulse width modulator U201 again closes the switches Q201 and Q202, and the cycle described above begins again. In particular, the pulse width modulator U201 adjusts the duty cycle so that the voltages across the capacitors C206, C215 remain at approximately the desired levels, for example, sixteen and twelve volts, respectively.

One advantage of the present invention is that the switch Q201 is protected from excessively high voltages, as explained above. The power supply of the present invention thus permits the use of high power switches which do not have the high voltage tolerances that are often required when using known switching power supplies. Furthermore, use of the power steering clamp 116 permits leakage energy to be rerouted subsequently to the transformer 120. This feature may improve the efficiency of the power supply by as much as ten percent, and also avoids the need for heat sinks to prevent overheating of circuit components. The present invention may thus suitably be used as a cool operating power supply in high density devices.

Figure 3:
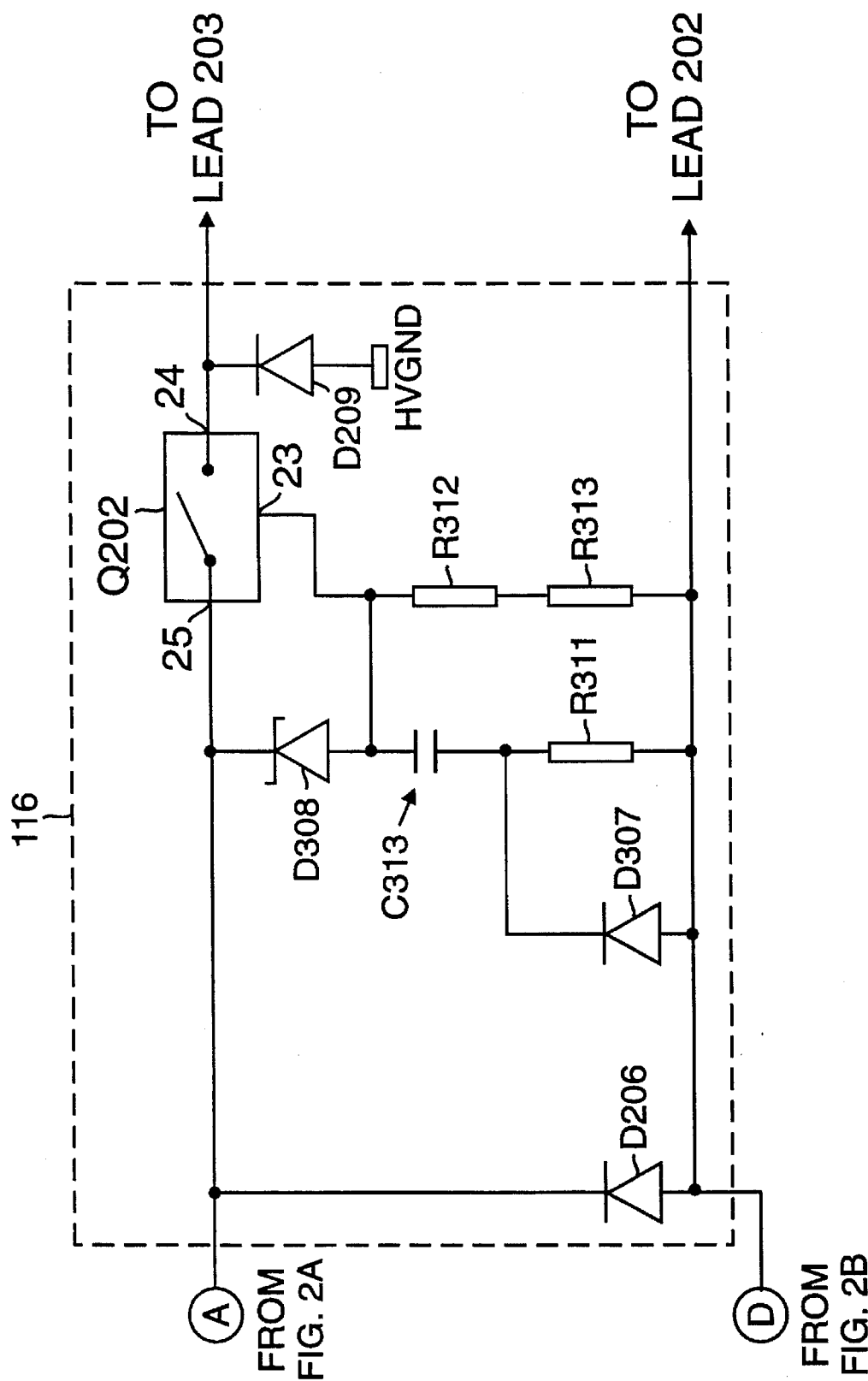
FIG. 3 shows an alternative embodiment of the power steering clamp of FIG. 1.

FIG. 3 shows an alternative embodiment of the power steering clamp 116 of FIG. 1. In the alternative embodiment, the power steering clamp 116 comprises the switch Q202, the clamp diodes D206 and D209, and driving circuitry to drive the gate 23 of the switch Q202. In this embodiment, however, the switch is controlled indirectly by the PWM controller U201. Specifically, the driving circuitry for the switch Q202 is coupled to the drain 21 of the switch Q201 so that the two switches Q201 and Q202 are effectively coupled together.

In the embodiment of the power steering clamp 116 shown in FIG. 3, the driving circuitry for the switch Q202 comprises a transient suppressor diode D308, a diode D307, a capacitor C313, and a plurality of resistors R311, R312, R313, arranged as shown. The cathode of the diode D308 preferably is tied to the source 25 of the switch Q202, and its anode preferably is tied to the gate 23 of the switch Q202. At least one resistor may be connected between the gate 23 of the switch Q202 and the drain 221 of the switch Q201. As shown in FIG. 3, the two resistors R312 and R313 are connected in series between the gate 23 of the switch Q202 and the drain 21 of the switch Q201. Also, one junction of the capacitor C313 preferably is tied to the gate 23 of the switch Q202 and the anode of the diode D308. The diode D307 and the resistor R311 preferably are connected in parallel and are connected between the second junction of the capacitor C313 and the drain 21 of the switch Q201 such that the anode of the diode D307 is tied to the drain 21 of the switch Q201.

A suitable diode D307 is an EGL 41G device available from the General Instrument Company. Similarly, a suitable diode D308 is a T6L41-15A device also available from the General Instrument Company. The resistors R311, R312 and R313 may suitably have values of 2.2 k-Ohm, 120 k-Ohm, and 120 k-Ohm, respectively. The capacitor C213 may suitably have the value of 1 nF.

Figure 4:
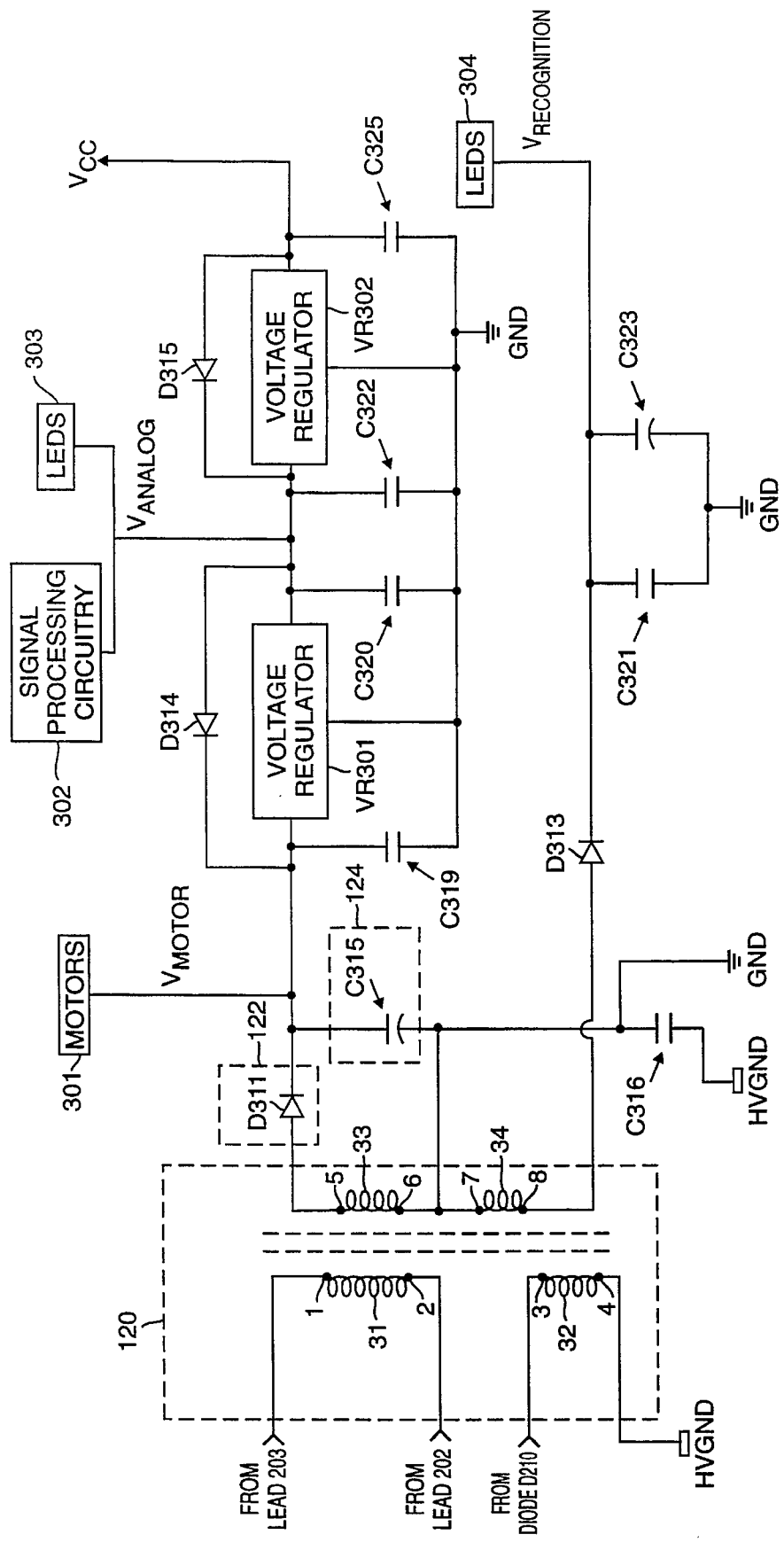
FIG. 4 shows additional circuitry which may be used where the power supply of the present invention is to be used as the power supply in a bill validator.

An exemplary use of the power supply of the present invention is as a power supply for a bill or banknote validator. FIG. 4 shows additional circuitry which may be used where the switching power supply of the present invention is to be used as part of a bill validator. In particular, the additional circuitry shown in FIG. 4 provide the secondary voltages needed to operate certain bill validators by providing the required power supply signals to other components of the bill validator. Typical secondary voltages may include, for example, $V_{MOTOR}$ which provides power for one or more motors 301, $V_{ANALOG}$ which provides power for signal processing circuitry 302, such as operational amplifiers, and one or more light emitting diodes (LEDs) or other light emitting devices 303, $V_{RECOGNITION}$ which drives one or more high powered or other LEDs 304, and $V_{CC}$. Typical values of these secondary voltage are, for example, 12 volts, 8 volts, 17 volts and 5 volts, respectively.

As shown in FIG. 4, the transformer 120 may suitably comprise the primary coil 31, the control coil 32, the secondary coil 33, and an additional secondary coil 34. The primary coil 31 and the control coil 32 of the transformer 120 in FIG. 4 may be suitably connected to the same circuitry as the primary and control coils of the transformer 120 of FIG. 2C.

With further reference to FIG. 4, the pin 6 of the secondary coil 33 may suitably be connected to GND. GND may also be connected, via a capacitor C316, to HVGND to provide further electromagnetic interference reduction. The pin 5 of the secondary coil 33 may be connected to the rectifier 122, which may suitably comprise the diode D311 with its anode connected to the pin 5. The energy storage means 124, which may suitably comprise a capacitor C315, may be connected between the cathode of the diode D311 and pin 6 of the secondary coil 33. $V_{MOTOR}$ may be taken from the energy storage means 124 so as to provide, for example, a 12-volt voltage supply. The motors 301 then may be connected, for example, to this 12-volt power supply signal. Voltage regulators VR301, VR302 with corresponding feedback diodes D314, D315 and capacitors C319, C320, C322 and C325, may be configured in a known manner to provide $V_{ANALOG}$ and $V_{cc}$, as shown in FIG. 4. Suitable voltage regulators VR301, VR302 are 78M08 and 78L05 devices, respectively, which are available from National Semiconductor Corporation. The operational amplifiers 302 and the light emitting devices 303, for example, may be connected to receive the $V_{ANALOG}$. Similarly, pin 6 of the secondary coil 33 and a pin 7 of the secondary coil 34 may be connected to the GND. A pin 8 of the secondary coil 34 may then be connected to the anode of a diode D313 and associated capacitors C321, C323 as shown in FIG. 3 to provide $V_{RECOGNITION}$ High powered and other light emitting devices 304 then may be connected to $V_{RECOGNITION}$. In this manner, the motors 301, the signal processing circuitry 302, and the LEDs 303, 304 are electrically connected to the secondary coils of the transformer 120 so as to receive the required power supplies for proper operation of the bill validator.

Although the present invention has been described with reference to specific embodiments, it will be appreciated that other arrangements within the spirit and scope of the present invention will be readily apparent to persons of ordinary skill in the art. The present invention is, therefore, limited only by the appended claims.

I claim:

1. A switching power supply comprising:

energy storage means;

a pulse width modulator controller;

a first switch capable of being in open and closed positions and controlled by the pulse width modulator controller; a transformer, wherein energy flows from the energy storage means to the transformer depending on the position of the first switch, and wherein leakage energy flows out of the transformer; and a power steering clamp Comprising a second switch, wherein the power steering clamp routes the leakage energy from the transformer to the energy storage means.

2. The switching power supply of claim 1 wherein each of the first switch and the second switch has a source, a drain and a gate; and wherein the power steering clamp further comprises:

(a) a first clamp diode connected between the drain of the first switch and the source of the second switch;

(b) a second clamp diode connected between the drain of the second switch and ground; and (c) circuitry for driving the gate of the second switch.

3. The switching power supply of claim 2 wherein the circuitry for driving the gate of the second switch is controlled by the pulse width modulator controller and comprises:

a high power inverter; and voltage translation circuitry.

4. The switching power supply of claim 3 wherein the voltage translation circuitry is ac coupled to the high power inverter.

5. The switching power supply of claim 3 wherein the voltage translation circuitry comprises:

a transient suppressor diode having an anode and a cathode, where the cathode is tied to the source of the second switch; and a capacitor connected between the anode and the high power inverter.

6. The switching power supply of claim 3 wherein the high power inverter is a complementary MOSFET high speed inverter.

7. The switching power supply of claim 3 wherein the high power inverter is suitable for operating at approximately 82 KHz.

8. The switching power supply of claim 1 wherein the energy storage means comprises a capacitor.

9. The switching power supply of claim 2 wherein the circuitry for driving the gate of second switch is coupled to the first switch.

10. The switching power supply of claim 9 wherein the circuitry for driving the gate of the second switch comprises:

(a) a transient suppressor diode having an anode and a cathode where the diode is tied to the source of the second switch and the anode is tied to the gate of the second switch;

(b) at least one resistor connected between the gate of the second switch and the drain of the first switch;

(c) a capacitor having two junctions where one junction is tied to the gate of the second switch; and (d) a diode, having an anode and a cathode, where the diode is connected between the second junction of the capacitor and the drain of the first switch, such that the cathode of the diode is connected to the second junction of the capacitor.

11. A switching power supply for use in a bill validator comprising:

energy storage means;

a pulse width modulator controller;

a first switch capable of being in opened and closed positions and controlled by the pulse width modulator controller;

a transformer having at least one primary coil and one secondary coil, wherein energy flows from the energy storage means to the transformer depending on the position of the first switch, and wherein leakage energy flows out of the transformer; and a power steering clamp comprising a second switch, wherein the power steering clamp routes the leakage energy from the transformer to the energy storage means;

wherein the at least one secondary coil is suitable for being connected electrically to at least one motor, signal processing circuitry, and at least one light emitting device.

12. The switching power supply of claim 11 wherein each of the first switch and the second switch each has a source, a drain and a gate; and wherein the power steering clamp further comprises:
(a) a first clamp diode connected between the drain of the first switch and the source of the second switch;
(b) a second clamp diode connected between the drain of the second switch and ground; and
(c) circuitry for driving the gate of the second switch.

13. The switching power supply of claim 12 wherein the circuitry for driving the gate of second switch is controlled by the pulse width modulator controller and comprises:

a high power inverter; and voltage translation circuitry.

14. The switching power supply of claim 13 wherein the voltage translation circuitry is ac coupled to the high power inverter.

15. The switching power supply of claim 13 wherein the voltage translation circuitry comprises:

a transient suppressor diode having an anode and a cathode, where the cathode is tied to the source of the second switch; and a capacitor connected between the anode and the high power inverter.

16. The switching power supply of claim 13 wherein the high power inverter is a complementary MOSFET high speed inverter.

17. The switching power supply of claim 13 wherein the high power inverter is suitable for operating at approximately 82 KHz.

18. The switching power supply of claim 11 wherein the energy storage means comprises a capacitor.

19. The switching power supply of claim 12 wherein the circuitry for driving the gate of second switch is coupled to the first switch.

20. The switching power supply of claim 19 wherein the circuitry for driving the gate of the second switch comprises:
(a) a transient suppressor diode having an anode and a cathode where the diode is tied to the source of the second switch and the anode is tied to the gate of the second switch;
(b) at least one resistor connected between the gate of the second switch and the drain of the first switch;
(c) a capacitor having two junctions where one junction is tied to the gate of the second switch; and
(d) a diode, having an anode and a cathode, where the diode is connected between the second junction of the capacitor and the drain of the first switch, such that the cathode of the diode is connected to the second junction of the capacitor.

21. A method for providing power in high density electronic devices, comprising:

storing energy in an energy storage means;

controlling a first switch with a pulse width modulator controller so as to control the flow of energy from the energy storage means to a transformer; and controlling a second switch with the pulse width modulator controller to route leakage energy from the transformer to the energy storage means for subsequent rerouting to the transformer.

* * * * *